(12) United States Patent
Jaini et al.

(10) Patent No.: US 11,985,571 B2
(45) Date of Patent: May 14, 2024

(54) PREDICTING USER INTERACTION WITH COMMUNICATIONS

(71) Applicant: Twilio Inc., San Francisco, CA (US)

(72) Inventors: Ankit Jaini, Belmont, CA (US); Ivan Senilov, Tallinn (EE); Jordan Earnest, Farmington Hills, MI (US); Claire Electra Longo, Denver, CO (US); Jiahui Cai, Denver, CO (US); Chiung-Yi Tseng, Berkeley, CA (US)

(73) Assignee: Twilio Inc., San Francisco, CA (US)

( * ) Notice: Subject to any disclaimer, the term of this patent is extended or adjusted under 35 U.S.C. 154(b) by 317 days.

(21) Appl. No.: 17/449,404

(22) Filed: Sep. 29, 2021

(65) Prior Publication Data

US 2023/0099888 A1    Mar. 30, 2023

(51) Int. Cl.
| | |
|---|---|
| *H04W 4/12* | (2009.01) |
| *G06F 11/34* | (2006.01) |
| *G06N 3/04* | (2023.01) |
| *G06N 3/08* | (2023.01) |
| *H04W 24/10* | (2009.01) |

(52) U.S. Cl.
CPC .......... *H04W 4/12* (2013.01); *G06F 11/3438* (2013.01); *G06N 3/04* (2013.01); *G06N 3/08* (2013.01); *H04W 24/10* (2013.01)

(58) Field of Classification Search
CPC ..... H04W 4/12; H04W 24/10; G06F 11/3438; G06N 3/04; G06N 3/08; G06N 3/0442; G06N 3/0464; G06N 3/084; G06N 3/0895; G06Q 10/04; G06Q 10/107; G06Q 30/0201; G06Q 30/0235; G06Q 30/0239; G06Q 30/0242; G06Q 30/0271; G06Q 30/0276; G06Q 30/0277; H04L 12/1895
See application file for complete search history.

(56) References Cited

U.S. PATENT DOCUMENTS

2014/0149223 A1 *  5/2014  Mathur .............. G06Q 30/0267
                                                      705/14.64

OTHER PUBLICATIONS

"Marketing Analytics: Biggest Challenges Marketers Face" by MTS published on Oct. 25, 2023, retrieved from https://martechseries.com/mts-insights/staff-writers/marketing-analytics-biggest-challenges-marketers-face, hereinafter MTS. (Year: 2023).*

* cited by examiner

*Primary Examiner* — Ronald Eisner
(74) *Attorney, Agent, or Firm* — Schwegman Lundberg & Woessner, P.A.

(57) ABSTRACT

A machine learning model may be trained using annotated communications data. Each communication (e.g., a short messaging system (SMS) message or email) is annotated with a measure of user interaction. The machine learning model is thus trained to predict a measure of user interaction for future communications. Before sending future communications, at least a portion of the communication is provided to the trained machine learning model to predict the expected measure of user interaction with the communication. In response to the prediction, the sender of the communication may alter the communication. The system may automatically send the communication if the predicted measure of user interaction exceeds a predetermined threshold and only prompt the user if the predicted measure of user interaction does not exceed the predetermined threshold.

20 Claims, 9 Drawing Sheets

| 410 → | COMMUNICATION TABLE | |
|---|---|---|
| 420 → | MESSAGE ID | SUBJECT |
| 430A → | 123 | UP TO $350 TO SPEND ON SELECT PRODUCTS |
| 430B → | 124 | JUST 3 DAYS LEFT TO TAKE ADVANTAGE OF THIS OFFER |
| 430C → | 125 | YOU HAVE BEEN SELECTED FOR A $350 DISCOUNT! |

| 440 → | INTERACTION TABLE | |
|---|---|---|
| 450 → | MESSAGE ID | INTERACTION RATE |
| 460A → | 123 | 0.12 |
| 460B → | 124 | 0.33 |
| 460C → | 125 | 0.45 |

| 410 — | COMMUNICATION TABLE | |
|---|---|---|
| 420 — | MESSAGE ID | SUBJECT |
| 430A — | 123 | UP TO $350 TO SPEND ON SELECT PRODUCTS |
| 430B — | 124 | JUST 3 DAYS LEFT TO TAKE ADVANTAGE OF THIS OFFER |
| 430C — | 125 | YOU HAVE BEEN SELECTED FOR A $350 DISCOUNT! |

| 440 — | INTERACTION TABLE | |
|---|---|---|
| 450 — | MESSAGE ID | INTERACTION RATE |
| 460A — | 123 | 0.12 |
| 460B — | 124 | 0.33 |
| 460C — | 125 | 0.45 |

*FIG. 4*

PREDICTING USER INTERACTION WITH COMMUNICATIONS

TECHNICAL FIELD

This application relates generally to training and using machine learning models and more specifically to a new and useful system and method for training and using machine learning models to predict user interaction with communications.

BACKGROUND

Machine learning models for natural language processing are trained to perform tasks such as generating an expected next word for an input sequence of words.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a block diagram of a database schema suitable for use in predicting a measure of user interaction for communications, according to some example embodiments.

DETAILED DESCRIPTION

Figure 1:
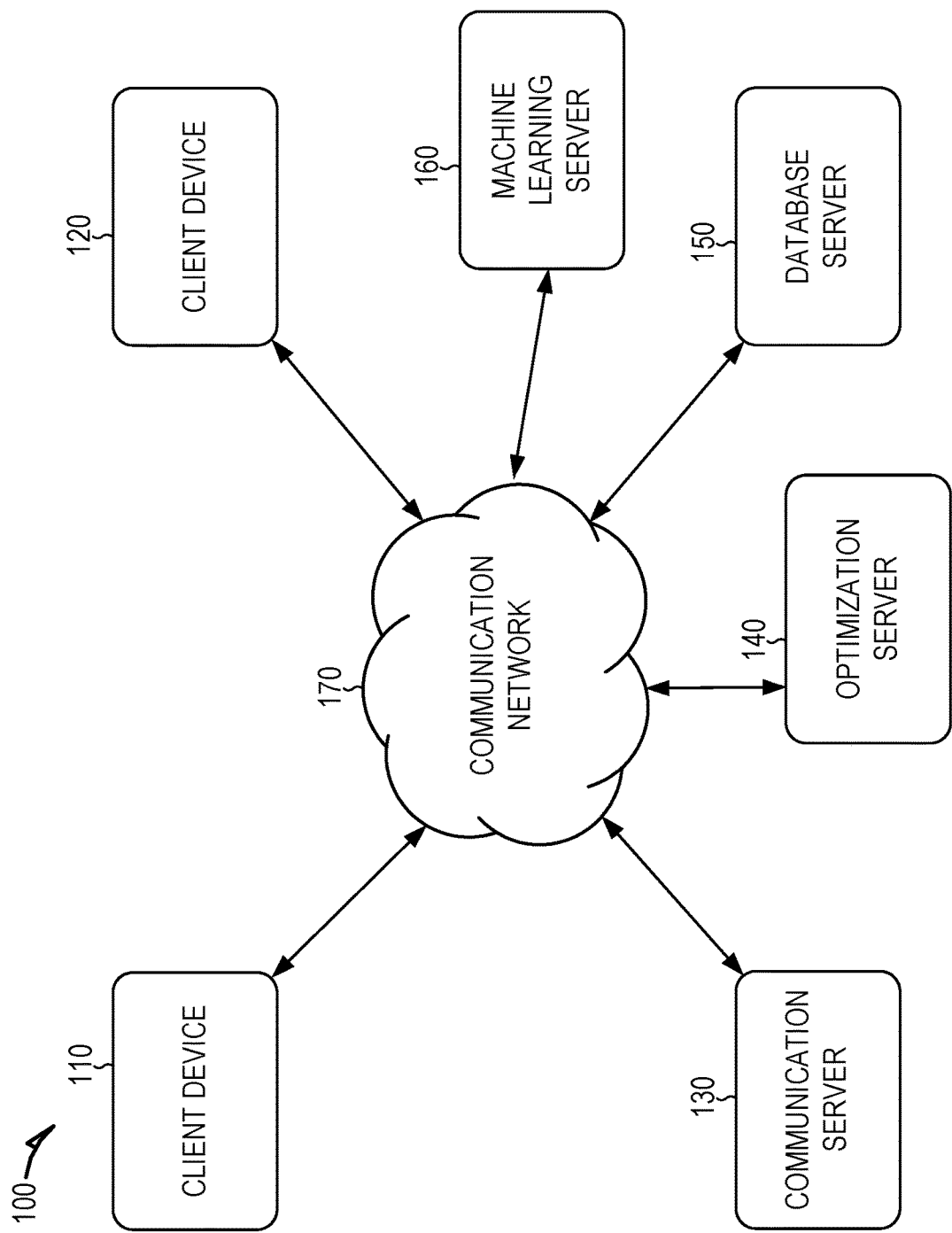
FIG. 1 is a network diagram showing client devices in communication with a service provider system and an optimization server, according to some example embodiments.

A machine learning model may be trained using annotated communications data. Each communication (e.g., a short messaging system (SMS) message or email) is annotated with a measure of user interaction. The machine learning model is thus trained to predict the measure of user interaction for future communications.

Communications can include various type of messages. For example, communications can include email, SMS, MMS, and voicemail, among others. The measure of user interaction may be determined in various ways. For example, the measure of user interaction may be based on a percentage of recipients that access the communication, a percentage of recipients that respond to the communication, a percentage of recipients that make a purchase in response to the communication, or any suitable combination thereof. In addition to considering the probability of the communication being considered by recipients in the aggregate, individual recipient patterns may be considered. For example, did a particular recipient open or click on a particular communication with particular words or phrases. Thus, past behavior of the specific intended recipients of the communication may be used to determine the predicted measure of user interaction of the draft communication. Before sending future communications, the communications may be provided to the trained machine learning model to predict the percentage of users expected to access each communication. In response to the prediction, the sender of the communication may alter the communication.

In some example embodiments, pairs of data comprising an arbitrary communication and a flag indicating whether the communication was accessed are used for training. A training set of at least a predetermined size (e.g., at least 1,000 pairs) may be used to finetuned a pretrained natural language processing model.

The process may proceed iteratively, with the revised communication evaluated to produce a new predicted measure of user interaction, further changes made, and so on, until the communication is sent. The system may automatically send the communication if the predicted measure of user interaction exceeds a predetermined threshold (e.g., 50%, 60%, or 80%) and only prompt the user if the predicted measure of user interaction does not exceed the predetermined threshold. The prompt to the user may request that the user revise the communication or approve sending the communication without modification.

Some machine learning models use attention factors to interpret the meanings of words that refer to other words in an input text. Information about the attention factors may be provided to users, further helping them to craft clear communications that invite interaction.

Existing tools for sending marketing communications and other notifications form a field of technology. Using the methods and systems described herein, these tools are improved by virtue of increasing the effectiveness of communications. Furthermore, network and processing resources consumed by unread communications will be reduced. For example, network bandwidth consumed by sending messages that are never read is reduced, processor cycles (and corresponding power consumption) spent in sending and receiving communications that are merely deleted without being read are reduced, memory consumption for storing messages that have been received and will not be read before deletion is reduced, and so on.

FIG. 1 is a network diagram 100 showing client devices 110 and 120 in communication with a communication server 130 and an optimization server 140, according to some example embodiments. The network diagram 100 also includes a database server 150, a machine learning server 160, and a communication network 170 interconnecting the devices, systems, and servers 110-160.

The machine learning server 160 accesses historical data from the database server 150. The historical data includes a set of previous communications and the observed measure of user interaction of each communication in the set. The machine learning server 160 trains one or more machine learning models using the historical data. Once trained, the machine learning model generates a predicted measure of user interaction for future communications. For example, communications may be categorized using a Long Short Term Memory (LSTM) based neural network that takes in a high-dimensional (e.g., at least one hundred dimensions) vector representing a communication and generates a numeric result indicating a predicted measure of user interaction for the communication. The measure of user interaction may be based on a probability that the communication will achieve a desired action such as the communication being opened, being read, being responded to, resulting in a sale, resulting in a donation, or any suitable combination thereof.

The optimization server 140 accesses a draft communication from the first client device and provides a predicted probability of the communication at achieving a desired action. For example, a user interface may be presented that includes an indication of a probability that the communication will achieve a desired action such as the communication being opened, being read, being responded to, resulting in a sale, resulting in a donation, or any suitable combination thereof. The optimization server 140 may generate the probability by using the trained machine learning model of the machine learning server 160.

A user of a first client device (e.g., the client device 110) uses the communication server 130 to send communications to other client devices (e.g., the client device 120). The communication server 130 may be an email server, a short messaging system server, a voicemail server, or any suitable combination. The communication server 130 may push communications to client devices by sending the content of the communication to the recipient client device in response to receiving the communication from the sending client device, store the content of the communication for retrieval by the recipient client device, or both.

The communication server 130, the optimization server 140, the machine learning server 160, or any suitable combination thereof provide applications to the client devices 110 and 120 via a web interface or an application interface. The communication server 130, the optimization server 140, the database server 150, the machine learning server 160, and the client devices 110 and 120 may each be implemented in a computer system, in whole or in part, as described below with respect to FIG. 8. The client devices 110 and 120 may be referred to collectively as client devices 110-120 or generically as a client device 110-120.

Though two client devices 110-120 are shown, more client devices 110-120 are contemplated. For example, thousands or millions of users may each have their own client device 110-120. Similarly, while a single database server 150 is shown, more or fewer database servers are contemplated. For example, a separate database server 150 may store data for each of the communication server 130, the optimization server 140, and the machine learning server 160. As another example, the communication server 130, the optimization server 140, and the machine learning server 160 may each store data locally instead of by accessing the database server 150. Additionally or alternatively, the database server 150 may be replaced by a distributed database comprising a cluster of multiple nodes.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The communication server 130, the optimization server 140, the database server 150, the machine learning server 160, and the client devices 110-120 are connected by the network 170. The network 170 may be any network that enables communication between or among machines, databases, and devices. Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
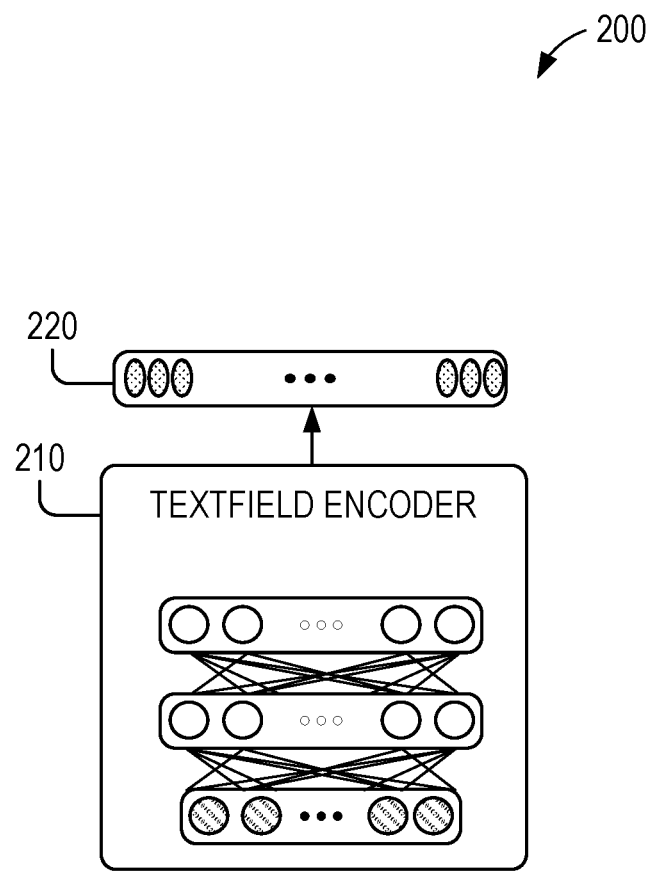
FIG. 2 shows an example machine learning model for text encoding.

FIG. 2 is a block diagram of an example model architecture 200 for language embedding. The model architecture 200 includes a language embedder 210 and a resulting vector 220. The language embedder 210 is trained so that the distance (or loss) function for two related text strings is reduced or minimized. For example, synonymous natural language text may be provided as inputs and the language embedder 210 trained to minimize the distance between the resulting vectors.

The specific architecture of the language embedder 210 may be chosen dependent on the type of input data for an embedding layer that is followed by some encoder architecture that creates a vector from the sequence. Embeddings and encoder parameters are shared between the text fields. In the simplest case, the encoder stage is just an elementwise average of the token embeddings. Tokens may be words, characters, syllables, or phrases.

Alternatively, the encoding may include converting pairs of words of the text to bigram vectors and combining the bigram vectors to generate a vector for the text. For example, the text "hot sale" may have a corresponding vector as a bigram, rather than two separate vectors for "hot" and "sale" that are combined. The text "This $250 discount is just for you" may be stripped of articles and prepositions and converted to vectors for each of the bigrams "$250 discount," "discount is," "is just," and "just you." The vector for a text string may be determined as an average of the bigram vectors for the bigrams in the text string.

In some example embodiments, a pre-trained vector embedding is used rather than training an embedding on a training set. For example, the doc2vec embedding may be used, pre-trained on a standardized set of documents. A custom vector training generated based on communications or documents that are similar to the communications or documents expected to be used by a machine learning model may give better results than a generic vector embedder.

Figure 3:
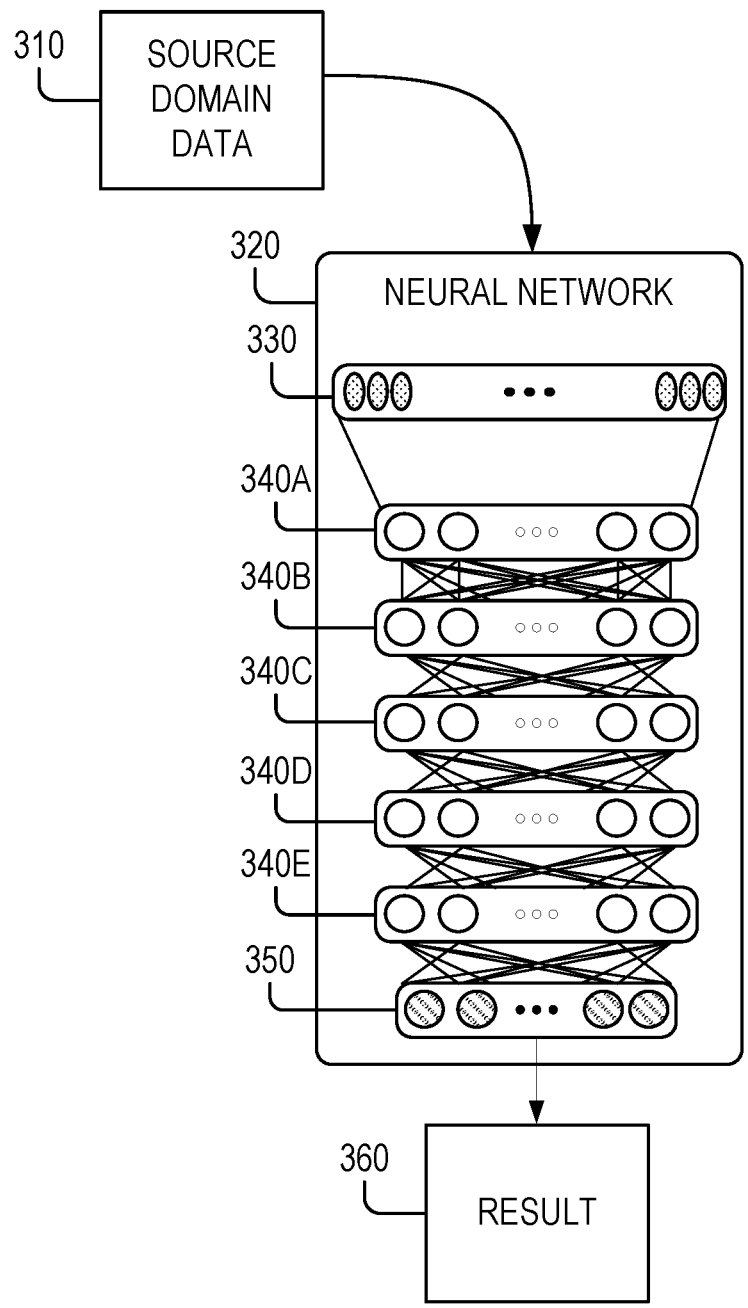
FIG. 3 is a block diagram of an example neural network, suitable for use in predicting a measure of user interaction for communications, according to some example embodiments.

FIG. 3 illustrates the structure of an example neural network 320. The neural network 320 takes source domain data 310 as input and processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 340 is the result 360. The intermediate layers 340A-340E are referred to as "hidden" because they do not interact directly with either the input or the output, and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

In a supervised learning phase, a model is developed to predict the output for a given set of inputs, and is evaluated over several epochs to more reliably provide the output that is specified as corresponding to the given input for the greatest number of inputs for the training dataset. The training dataset comprises input examples with labeled outputs. For example, a user may label images based on their content and the labeled images may be used to train an image identifying model to generate the same labels. As another example, communications may be labeled to indicate a measure of user interaction (e.g., the effectiveness of the communication at achieving a desired action). For example, a communication can be labeled to indicate the percentage of recipients of the communication that opened the communication, read the communication, responded to the communication, and the like.

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network (CNN), a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example type of layer in the neural network 320 is an LSTM layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

In some example embodiments, the machine learning model comprises a multi-headed attention layer. Attention functions map a query and a set of key-value pairs to an output, where the contribution of each key-value pair to the output is weighted according to a compatibility function of the query with the key of the key-value pair. Attention functions include additive attention and dot-product attention. Additive attention computes the compatibility function using a feed-forward network with a single hidden layer. Dot-product attention may be computed using matrix multiplication.

Multi-headed attention projects keys, values, and queries using learned linear projections. Thus, instead of a function of the form Attention(Q, K, V), where Q, K, and V are vectors of the dimensionality of the model, a function of the form MultiHead(Q, K, V)=Concat(head1, . . . , headh)WO is used, where h is the number of heads. Each headi=Attention(QWiQ, KWiK, VWiV), where the W matrices are projection matrices that convert the high-dimensional vectors used in the model to reduced dimensionality. In some example embodiments, the number of heads is eight.

Multi-headed attention layers may be used in encoder-decoder attention layers in which the queries come from the previous decoder layer and the keys and values come from the output of the encoder. As a result, every position in the decoder may have an attention value for every position in the entire input sequence. The encoder may include self-attention layers in which the keys, values, and queries for a layer of the encoder all come from the previous layer of the encoder.

One of ordinary skill in the art will be familiar with several machine learning algorithms that may be applied with the present disclosure, including linear regression, random forests, decision tree learning, neural networks, DNNs, genetic or evolutionary algorithms, and the like.

FIG. 4 is a block diagram of a database schema 400 suitable for use in predicting a measure of user interaction for communications, according to some example embodiments. The database schema 400 includes a communication table 410 and an interaction table 440. The communication table 410 includes rows 430A, 430B, and 430C of a format 420. The interaction table 440 uses a format 450 for rows 460A, 460B, and 460C. For illustration purposes, only three rows are shown in each table of the database schema 400, but hundreds, thousands, or millions of rows are used in various example embodiments.

Each of the rows 430A-430C of the communication table 410 stores a subject of a communication and a unique identifier for the communication, as shown by the format 420. In some example embodiments, additional fields are stored in the rows 430A-430C, such as a date and time of the communication, a body of the communication, a vector encoding of the subject of the communication, a vector encoding of the body of the communication, an identifier of an account from which the communication was sent, or any suitable combination thereof.

The format 450 specifies that each of the rows 460A-460C stores a message identifier and an interaction rate (a measure of user interaction). The message identifiers may be cross-referenced with the message identifiers in the communication table 410. Thus, the message with subject "Up to $250 to spend on select products" has an interaction rate of 0.12, but the message with subject "You have been selected for a $250 discount!" has a much higher interaction rate of 0.45.

A machine learning model may be trained by converting the text of the subjects of the communications into a vector representation and using the interaction rate of each communication as the annotation for the communication. As a result, the machine learning model is trained to predict an interaction rate for future communications, based on the subjects of the future communications.

Figure 5:
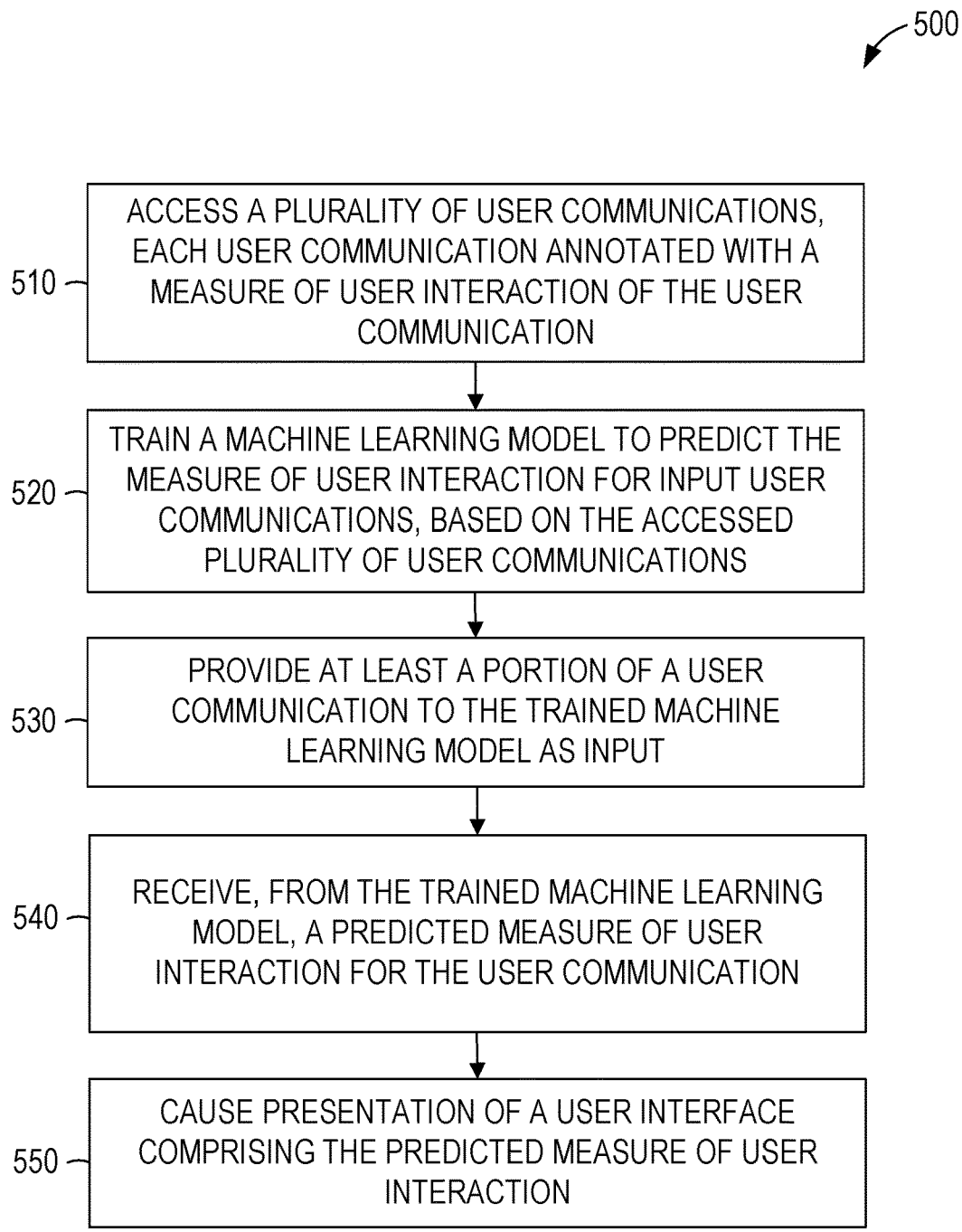
FIG. 5 is a flowchart of a method of training a machine learning model and using the trained machine learning model to predict a measure of user interaction for communications, according to some example embodiments.
Figure 9:
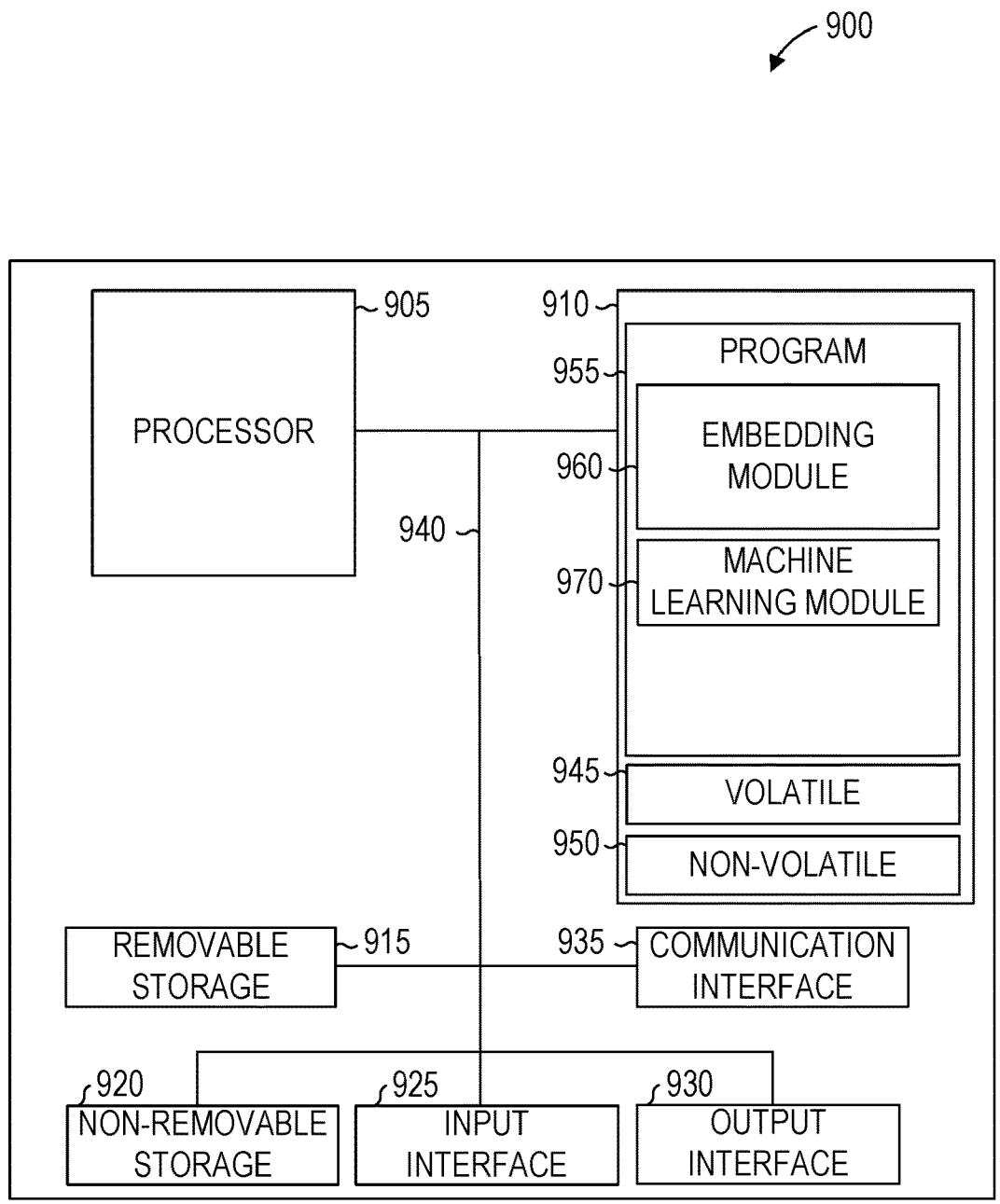
FIG. 9 is a schematic diagram of a computing system suitable for performing one or more methods described herein, according to some example embodiments.

FIG. 5 is a flowchart of a method 500 of training a machine learning model and using the trained machine learning model to predict a measure of user interaction for communications, according to some example embodiments. The method 500 includes operations 510, 520, 530, 540, and 550. By way of example and not limitation, the method 500 is described as being performed by the systems and devices of FIG. 1 (implemented in whole or in part as a computer 900 as shown in FIG. 9).

In operation 510, a machine learning module 970 accesses a plurality of user communications, each user communication annotated with measure of user interaction with the communication. For example, emails, email subjects, or SMS messages stored in the communication table 410 in the database server 150 may be accessed. Each accessed communication may include metadata (e.g., source identifier, destination identifier, date and time of creation, date and time of reception, carrier identifier, or any suitable combination thereof) and content (e.g., text provided by the communicating user). The annotation may be a binary value indicating whether the communication (e.g., the email) was opened. Alternatively, the measure of user interaction with the user communication indicates a probability that the communication was opened (e.g., a percentage of recipients that opened the email). With reference to FIG. 3, the annotated user communications are a training set for training the neural network 320.

The machine learning module 970, in operation 520, trains, based on the accessed plurality of user communications, a machine learning model to predict the measure of user interaction for input user communications. For example, the user communications may be converted to vector representations by an embedding module 960 and used to train a CNN to generate a numeric output in the range 0 to 1 that indicates the probability of a user opening the communication. In some example embodiments, the machine learning model includes one or more multi-headed attention layers.

In operation 530, the optimization server 140 provides at least a portion of a user communication to the trained machine learning model as input. For example, the user communication may be an email with the subject "We offer you a $50 discount!" Pre-processing of the user communication may be performed (e.g., by using the embedding module 960 to convert the portion or all of the user communication to a vector format). For example, just the subject of the email may be converted to a vector and provided as input to the trained machine learning model.

The optimization server 140 receives, from the trained machine learning model, a predicted measure of user interaction for the user communication (operation 540). Continuing with this example, the predicted probability of a user opening an email (a measure of user interaction) with the subject "We offer you a $50 discount" may be 0.78.

In operation 550, the optimization server 140 causes presentation of a user interface comprising the predicted measure of user interaction. For example, the optimization server 140 may send a hypertext markup language (HTML) document to the client device 110 for display in a web browser. The HTML document, when rendered by the web browser on a display device of the client device 110 may include text or graphics representing the predicted measure of user interaction, such as by indicating a 78% chance of user interaction. In some example embodiments, the chance of user interaction is presented more or less granularly. For example, predetermined thresholds may be used to divide the chance of user interaction into three color-coded ranges with the user interface comprising an area in the color corresponding to the chance of user interaction (e.g., red for 0-32% chance of interaction, yellow for 33-65% chance of interaction, and green for 66-100% chance of interaction).

As a result of the application of the method 500, a machine learning model may be trained by the machine learning server 160 using a historical communication data; the resulting machine learning model is used to predict a chance of interaction for future communications and present this information to a user. By comparison with existing methods of sending communications without predicting a chance of interaction using a trained machine learning model, the accuracy of predicted user interaction is improved, enabling the user to revise communications for greater interaction before sending. In some example embodiments, communications are automatically sent when the predicted measure of user interaction exceeds a threshold. In these embodiments, messages are only sent when they are likely to be engaged with, reducing the number of low-interaction messages sent and improving the efficiency of the communication server 130 by reducing the amount of network bandwidth and processor cycles used to process messages that are erased upon receipt. Accordingly, use of the method 500 improves the operation of the communication server 130.

Figure 6:
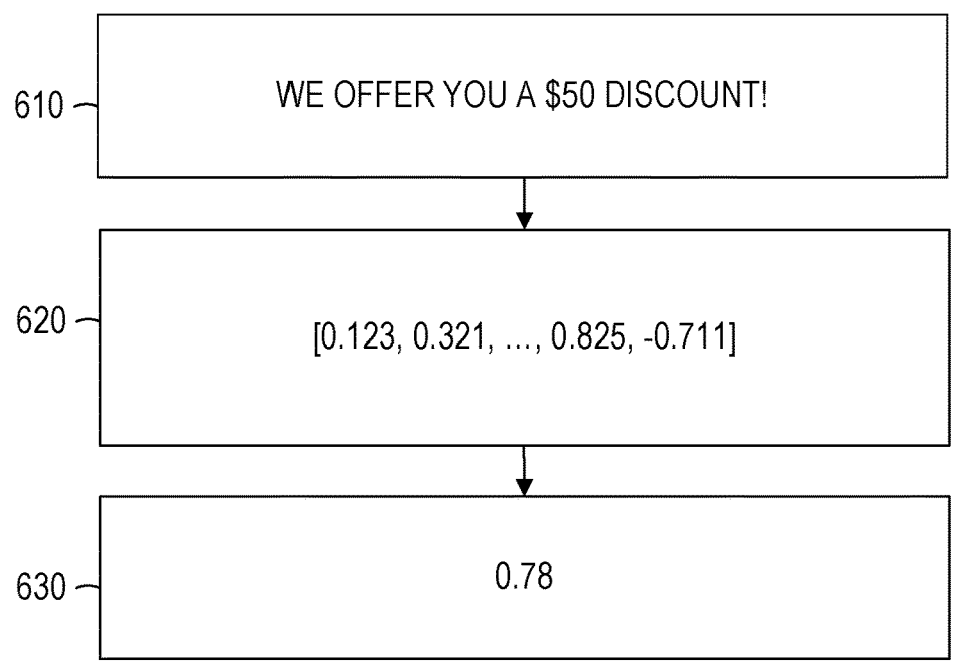
FIG. 6 shows an example data flow, beginning with a communication and ending with a measure of user interaction for communications.

FIG. 6 shows an example data flow 600, beginning with a communication 610 and ending with a predicted measure of user interaction 630 for the communication. The example communication 610 may be the user communication provided to the trained machine learning model in operation 530.

A vector representation 620 is a high-dimensional vector of floating-point values generated by the language embedder 210 based on the communication 610. The vector representation 620 cannot be directly parsed by humans to determine meaning, but is suitable for use as an input to a machine learning model, either for training or for use by a trained model.

The trained machine learning model generates the predicted measure of user interaction 630 in response to receiving the vector representation 620 as input. The predicted measure of user interaction 630 may be used to generate a user interface informing a user of the probability of user interaction with the communication 610, may be used to automatically determine to send or reject the communication 610, or both.

Figure 7:
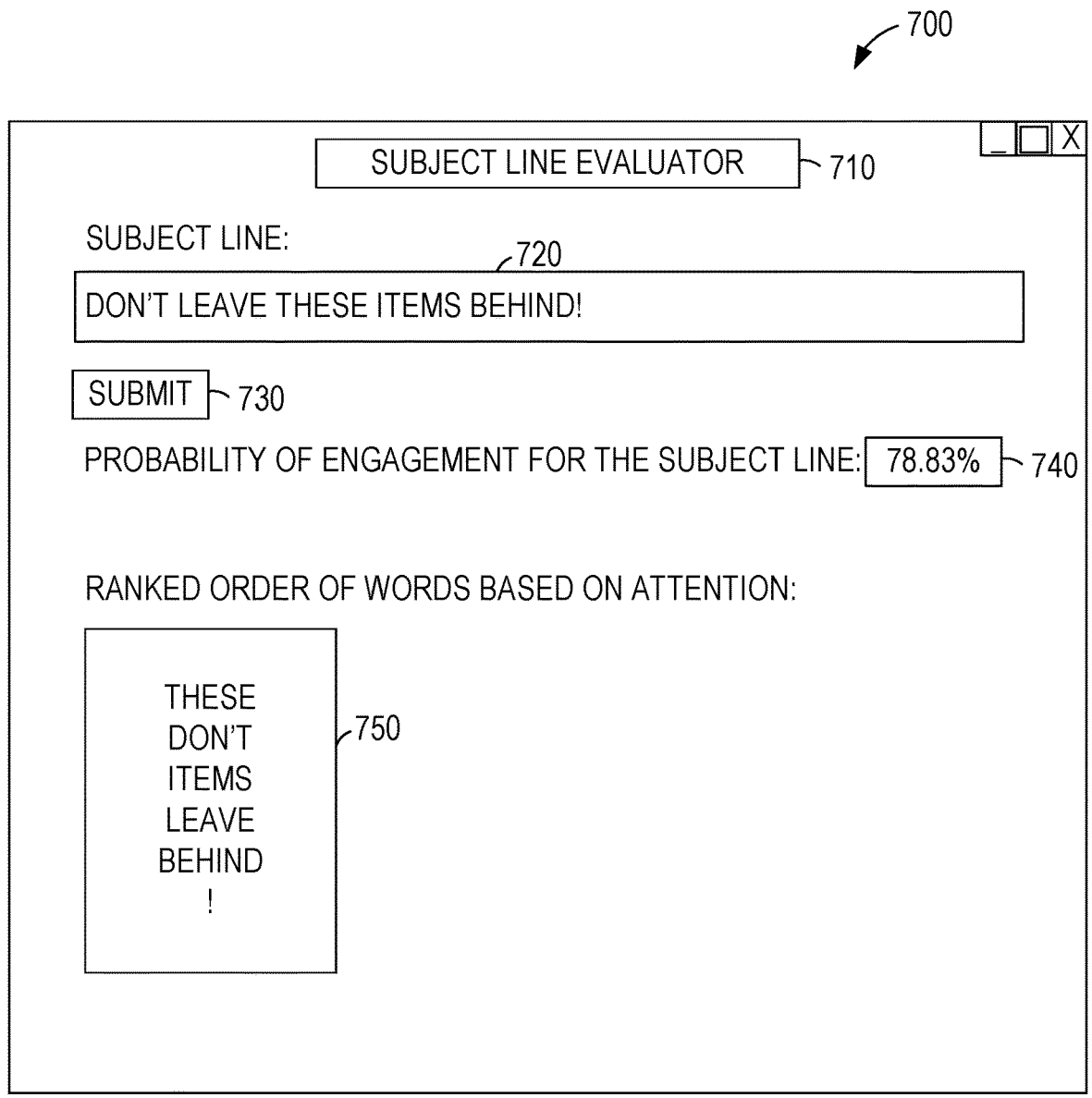
FIG. 7 shows an example user interface for a subject line evaluator, according to some example embodiments.

FIG. 7 shows an example user interface 700 for a subject line evaluator, according to some example embodiments. The user interface 700 includes a title 710, a subject field 720, a button 730, a probability 740, and a word ranking 750. The user interface 700 may be presented on a display device of the client device 110, in response to data or instructions received from the optimization server 140.

The title 710 indicates that the user interface 700 is for a subject line evaluator. The subject field 720 receives text entered by the user for a subject line of a communication. The button 730 is operable to submit the text in the subject field 720 to the optimization server 140 for evaluation.

In response to receiving the text in the subject field 720, the optimization server 140 evaluates the received text to determine a measure of user interaction for a communication using the subject line. For example, the text may be converted to a vector representation using a language embedder and the vector may be provided as an input to a trained machine learning model. The output of the trained machine learning model may be the predicted probability of interaction. The user interface 700 is updated to include the probability 740.

Additionally or alternatively, the machine learning model may provide a ranking of the words in the subject line, as shown in the word ranking 750. For example, internal attention states of the machine learning model may be accessed to determine relative attention levels for each word in the subject line. The words are sorted based on the attention levels and included in the word ranking 750.

In some example embodiments, different machine learning models are used to provide the probability 740 and the word ranking 750. For example, a CNN that does not make use of an attention layer may be used to generate the probability 740 and a machine learning model using a multi-headed attention layer may be used to generate the word ranking 750.

Figure 8:
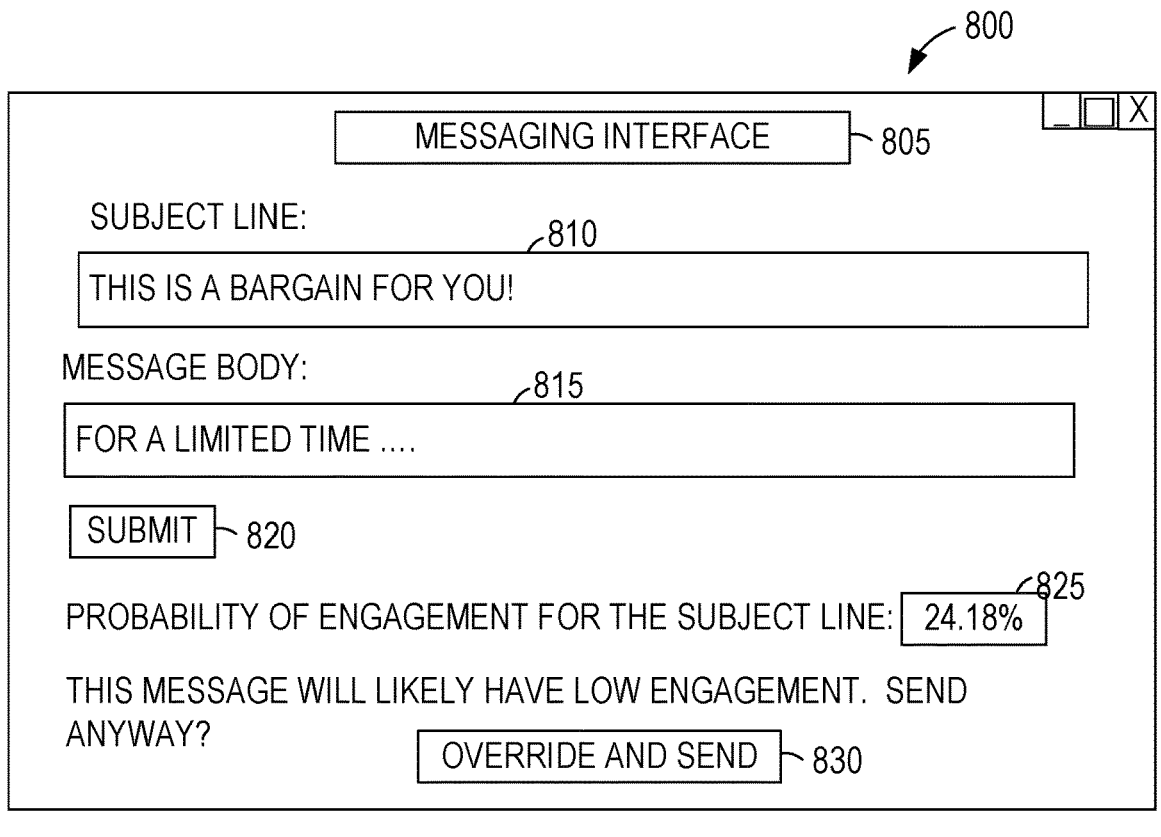
FIG. 8 shows example user interfaces for messaging, according to some example embodiments.
Figure 8:
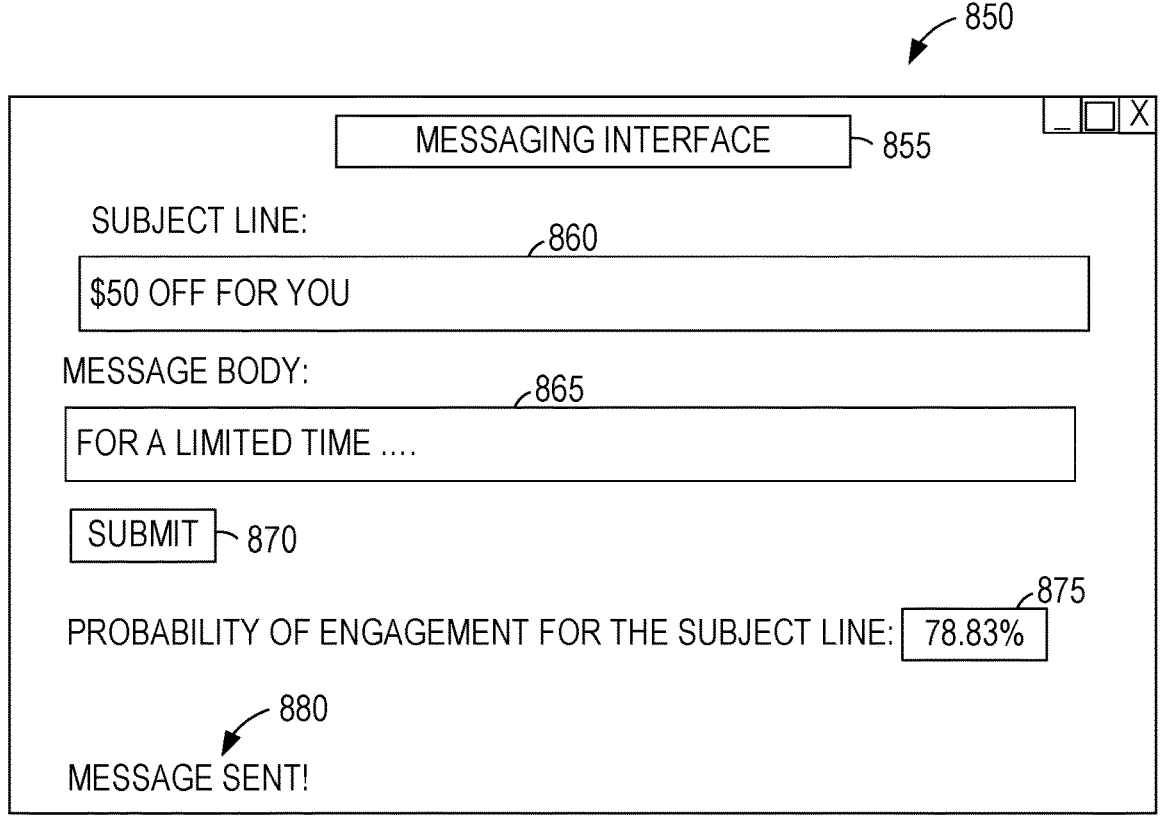

FIG. 8 shows example user interfaces for messaging, according to some example embodiments. A user interface 800 includes a title 805, a subject field 810, a body field 815, a button 820, a probability 825, and a button 830. A user interface 850 includes a title 855, a subject field 860, a body field 865, a button 870, a measure of user interaction 875, and a notification 880. The user interfaces 800 and 850 may be presented on a display device of the client device 110, in response to data or instructions received from the communication server 130.

The title 805 indicates that the user interface 800 is for a messaging interface. The subject field 810 receives text entered by the user for a subject line of a communication. The body field 815 receives text entered by the user for a message body of the communication. The button 820 is operable to submit the text in the subject field 810, the body field 815, or both to the optimization server 140 for evaluation. For example, the text in the subject field 810 and the body field 815 may be sent from the client device 110 to the communication server 130 and forwarded from the communication server 130 to the optimization server 140.

In response to receiving the text in the subject field 810, the body field 815, or both, the optimization server 140 evaluates the received text to determine a measure of user interaction for a communication using the evaluated text. For example, the text may be converted to a vector representation using a language embedder and the vector may be provided as an input to a trained machine learning model. The output of the trained machine learning model may be the predicted probability of interaction. The user interface 800 is updated to include the probability 825.

Based on the probability 825 and a predetermined threshold (e.g., 50%), a warning is presented regarding a low measure of user interaction. In response, the user may edit the subject field 810, the body field 815, or both, and re-submit the edited text using the button 820. Alternatively, the user may press the button 830 to cause the communication to be sent despite the low measure of user interaction. As still another alternative, the measure of user interaction may be automatically updated while the user types, without the user submitting the changes using the button 820.

The title 855 indicates that the user interface 850 is also for the messaging interface. The subject field 860 receives text entered by the user for a subject line of a communication. The body field 865 receives text entered by the user for a message body of the communication. The button 870 is operable to submit the text in the subject field 860, the body field 865, or both to the optimization server 140 for evaluation.

In response to receiving the text in the subject field 860, the body field 865, or both, the optimization server 140 evaluates the received text to determine a measure of user interaction for a communication using the evaluated text. The user interface 850 is updated to include the measure of user interaction 875.

Based on the measure of user interaction 875 and a predetermined threshold (e.g., 50%), the message is automatically sent without further user involvement. For example, the user interface 800 may be presented first and, in response to the warning, the user revises the text in the subject field 860 and resubmits the communication. In response to the revised subject field 860, the measure of user interaction 875 of the communication is updated and the message is automatically sent.

FIG. 9 is a schematic diagram of a computing system 900 suitable for performing one or more methods described herein, according to some example embodiments. All components need not be used in various embodiments. For example, clients (e.g., the client device 110), servers (e.g., the optimization server 140), autonomous systems, and cloud-based network resources (e.g., cloud storage of the database server 150) may each be use a different set of components, or, in the case of servers for example, larger storage devices.

The computer system 900 includes a processor 905, a computer-storage medium 910, removable storage 915, and non-removable storage 920, all connected by a bus 940. Although the example computing device is illustrated and described as the computer system 900, the computing device may be in different forms in different embodiments. For example, the computing device 900 may instead be a smartphone, a tablet, a smartwatch, or another computing device including elements the same as or similar to those illustrated and described with regard to FIG. 9. Devices such as smartphones, tablets, and smartwatches are collectively referred to as "mobile devices." Further, although the various data storage elements are illustrated as part of the computer 900, the storage may also or alternatively include cloud-based storage accessible via a network, such as the Internet, or server-based storage.

The processor 905 may be a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof. The term "processor" is intended to include multi-core processors that may comprise two or more independent processors (sometimes referred to as "cores") that may execute instructions contemporaneously. Although FIG. 9 shows a single processor 905, the computer system 900 may include a single processor with a single core, a single processor with multiple cores (e.g., a multi-core processor), multiple processors with a single core, multiple processors with multiple cores, or any combination thereof.

The computer-storage medium 910 includes volatile memory 945 and non-volatile memory 950. The volatile memory 945 or the non-volatile memory 950 stores a program 955. The computer 900 may include, or have access to, a computing environment that includes a variety of computer-readable media, such as the volatile memory 945, the non-volatile memory 950, the removable storage 915, and the non-removable storage 920. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions embodying any one or more of the methodologies or functions described herein. The instructions may also reside, completely or partially, within the processor 905 (e.g., within the processor's cache memory) during execution thereof by the computer system 900.

The computer system 900 includes or has access to a computing environment that includes an input interface 925, an output interface 930, and a communication interface 935. The output interface 930 interfaces to or includes a display device, such as a touchscreen, that also may serve as an input device. The input interface 925 interfaces to or includes one or more of a touchscreen, a touchpad, a mouse, a keyboard, a camera, one or more device-specific buttons, one or more sensors integrated within or coupled via wired or wireless data connections to the computer system 900, and other input devices. The computer system 900 may operate in a networked environment using the communication interface 935 to connect to one or more remote computers, such as database servers. The remote computer may include a personal computer (PC), server, router, network PC, peer device or other common network node, or the like. The communication interface 935 may connect to a local-area network (LAN), a wide-area network (WAN), a cellular network, a WiFi network, a Bluetooth network, or other networks.

Computer instructions stored on a computer-storage medium (e.g., the program 955 stored in the computer-storage medium 910) are executable by the processor 905 of the computer system 900. As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed key-value store, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors 905. Specific examples of machine-storage media, computer-storage media, and/or device-storage media include non-volatile memory, including by way of example semiconductor memory devices, e.g., EPROM, EEPROM, field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such transitory media, at least some of which are covered under the term "signal medium" discussed below. The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The program 955 may further be transmitted or received over a network using a transmission medium via the communication interface 935 and utilizing any one of a number of well-known transfer protocols (e.g., HTTP). Examples networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the computer system 900, and includes digital or analog communications signals or other intangible media to facilitate communication of such software.

The program 955 is shown as including an embedding module 960 and a machine learning module 970. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The embedding module 960 trains a textfield encoder to generate vectors based on natural language inputs, uses a textfield encoder to generate vectors based on natural language inputs, or both. The generated vectors may be suitable for input to a machine learning model for training or use. The machine learning module 970 trains a machine learning model to predict a probability of user interaction with communications, uses a trained machine learning model to predict a probability of user interaction with communications, or both.

In alternative embodiments, the computer system 900 operates as a standalone device or may be coupled (e.g., networked) to other machines. In a networked deployment, the computer system 900 may operate in the capacity of a server machine or a client machine in a server-client network environment, or as a peer machine in a peer-to-peer (or distributed) network environment. The computer system 900 may comprise, but not be limited to, a server computer, a client computer, a PC, a tablet computer, a laptop computer, a netbook, a smart phone, a mobile device, a network router, a network switch, a network bridge, or any machine capable of executing instructions of the program 955, sequentially or otherwise, that specify actions to be taken by the computer system 900. Further, while only a single computer system 900 is illustrated, the term "machine" shall also be taken to include a collection of computer systems 900 that individually or jointly execute the instructions to perform any one or more of the methodologies discussed herein.

The input interface 925 and the output interface 930 include components to receive input, provide output, produce output, transmit information, exchange information, capture measurements, and so on. The specific input/output (I/O) components that are included in a particular computer system 900 will depend on the type of computer system. For example, portable devices such as mobile phones will likely include a touch input device or other such input mechanisms, while a headless server machine will likely not include such a touch input device. It will be appreciated that the I/O components may include many other components that are not shown in FIG. 9. The input interface 925 may interface with visual components (e.g., a display such as a plasma display panel, a light emitting diode (LED) display, a liquid crystal display (LCD), a projector, or a cathode ray tube (CRT)), acoustic components (e.g., speakers), other signal generators, and so forth. The input interface 925 may interface with alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

In view of the above described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: one or more processors; and a memory that stores instructions that, when executed by the one or more processors, cause the one or more processors to perform operations comprising: providing a user communication to a trained machine learning model as input; receiving, from the trained machine learning model, a predicted measure of user interaction for the user communication; and causing presentation of a user interface comprising the predicted measure of user interaction.

In Example 2, the subject matter of Example 1 includes, wherein the operations further comprise: accessing a plurality of user communications, each user communication annotated with a measure of user interaction of the user communication; and training the machine learning model to predict the measure of user interaction for input user communications, based on the accessed plurality of user communications.

In Example 3, the subject matter of Example 2 includes, wherein the operations further comprise: causing presentation, in the user interface, of a ranking of words in the user communication.

In Example 4, the subject matter of Examples 2-3 includes, wherein: the plurality of user communications comprises a plurality of messages.

In Example 5, the subject matter of Example 4 includes, wherein: the measure of user interaction of the user communication comprises a binary value indicating whether the message was accessed.

In Example 6, the subject matter of Example 4 includes, wherein: the measure of user interaction of the user communication indicates a probability that the message was accessed.

In Example 7, the subject matter of Examples 2-6 includes, wherein: the plurality of user communications comprises a plurality of short messaging system (SMS) messages.

In Example 8, the subject matter of Examples 1-7 includes, wherein: the machine learning model comprises a multi-headed attention layer.

Example 9 is a method comprising: providing, by one or more processors, a user communication to a trained machine learning model as input; receiving, from the trained machine learning model, a predicted effectiveness for the user communication; and causing presentation of a user interface comprising the predicted effectiveness.

In Example 10, the subject matter of Example 9 includes, causing presentation, in the user interface, of a ranking of words in the user communication.

In Example 11, the subject matter of Examples 9-10 includes, wherein: the machine learning model comprises a multi-headed attention layer.

In Example 12, the subject matter of Examples 9-11 includes, accessing, from a database, a plurality of user communications, each user communication annotated with a measure of user interaction of the user communication; and training, by the one or more processors, a machine learning model to predict the measure of user interaction for input user communications, based on the accessed plurality of user communications.

In Example 13, the subject matter of Example 12 includes, wherein: the plurality of user communications comprises a plurality of messages.

In Example 14, the subject matter of Example 13 includes, wherein: the measure of user interaction of the user communication comprises a binary value indicating whether the message was accessed.

In Example 15, the subject matter of Example 13 includes, wherein: the measure of user interaction of the user communication indicates a probability that the message was accessed.

In Example 16, the subject matter of Examples 12-15 includes, wherein: the plurality of user communications comprises a plurality of short messaging system (SMS) messages.

Example 17 is a non-transitory machine-readable medium that stores instructions which, when executed by one or more processors, cause the one or more processors to perform operations comprising: providing a user communication to a trained machine learning model as input; receiving, from the trained machine learning model, a predicted measure of user interaction for the user communication; and causing presentation of a user interface comprising the predicted measure of user interaction.

In Example 18, the subject matter of Example 17 includes, wherein the operations further comprise: accessing a plurality of user communications, each user communication annotated with a measure of user interaction with the user communication; and training the machine learning model to predict the measure of user interaction for input user communications, based on the accessed plurality of user communications.

In Example 19, the subject matter of Example 18 includes, wherein: the plurality of user communications comprises a plurality of messages.

In Example 20, the subject matter of Example 19 includes, wherein: the measure of user interaction of the user communication is a binary value indicating whether the message was accessed.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

We claim:

1. A system comprising:
one or more processors;
and a memory that stores instructions that, when executed by the one or more processors, cause the one or more processors to perform operations comprising:
providing a user communication to a trained machine learning model as input;
receiving, from the trained machine learning model, a predicted measure of user interaction for the user communication; and
causing presentation of a user interface comprising the predicted measure of user interaction.

2. The system of claim 1, wherein the operations further comprise:
accessing a plurality of user communications, each user communication annotated with a measure of user interaction of the user communication; and
training the machine learning model to predict the measure of user interaction for input user communications, based on the accessed plurality of user communications.

3. The system of claim 2, wherein the operations further comprise:
causing presentation, in the user interface, of a ranking of words in the user communication.

4. The system of claim 2, wherein: the plurality of user communications comprises a plurality of messages.

5. The system of claim 4, wherein: the measure of user interaction of the user communication comprises a binary value indicating whether a message of the plurality of messages was accessed.

6. The system of claim 4, wherein: the measure of user interaction of the user communication indicates a probability that a message of the plurality of messages was accessed.

7. The system of claim 2, wherein: the plurality of user communications comprises a plurality of short messaging system (SMS) messages.

8. The system of claim 1, wherein: the machine learning model comprises a multi-headed attention layer.

9. A method comprising:
providing, by one or more processors, a user communication to a trained machine learning model as input;
receiving, from the trained machine learning model, a predicted measure of user interaction for the user communication; and
causing presentation of a user interface comprising the predicted measure of user interaction.

10. The method of claim 9, further comprising:
causing presentation, in the user interface, of a ranking of words in the user communication.

11. The method of claim 9, wherein:
the machine learning model comprises a multi-headed attention layer.

12. The method of claim 9, further comprising:
accessing, from a database, a plurality of user communications, each user communication annotated with a measure of user interaction of the user communication; and
training, by the one or more processors, the machine learning model to predict the measure of user interaction for input user communications, based on the accessed plurality of user communications.

13. The method of claim 12, wherein:
the plurality of user communications comprises a plurality of messages.

14. The method of claim 13, wherein:
the measure of user interaction of the user communication comprises a binary value indicating whether a message of the plurality of messages was accessed.

15. The method of claim 13, wherein:
the measure of user interaction of the user communication indicates a probability that a message of the plurality of messages was accessed.

16. The method of claim 12, wherein:
the plurality of user communications comprises a plurality of short messaging system (SMS) messages.

17. A non-transitory machine-readable medium that stores instructions which, when executed by one or more processors, cause the one or more processors to perform operations comprising:
- providing a user communication to a trained machine learning model as input;
- receiving, from the trained machine learning model, a predicted measure of user interaction for the user communication; and
- causing presentation of a user interface comprising the predicted measure of user interaction.

18. The non-transitory machine-readable medium of claim 17, wherein the operations further comprise:
- accessing a plurality of user communications, each user communication annotated with a measure of user interaction with the user communication; and
- training the machine learning model to predict the measure of user interaction for input user communications, based on the accessed plurality of user communications.

19. The non-transitory machine-readable medium of claim 18, wherein:
the plurality of user communications comprises a plurality of messages.

20. The non-transitory machine-readable medium of claim 19, wherein:
the measure of user interaction of the user communication is a binary value indicating whether a message of the plurality of messages was accessed.

\* \* \* \* \*